INVENTOR.
RAY H. LUEBBE JR.
LEONARD M. CARREIRA

BY

ATTORNEY 3,645,883
PHOTOELECTROPHORETIC IMAGING APPARATUS EMPLOYING PHOTOSENSITIVE PARTICLES EXHIBITING FATIGUE CHARACTERISTICS
Ray H. Luebbe, Jr., Rochester, and Leonard M. Carreira, Penfield, N.Y., assignors to Xerox Corporation, Stamford, Conn.
Filed June 1, 1970, Ser. No. 42,409
Int. Cl. B01d 13/02
U.S. Cl. 204—300
2 Claims

ABSTRACT OF THE DISCLOSURE

An electrophoretic imaging system comprising exposing a suspension of electrically photosensitive particles in a liquid carrier to imagewise light and, subsequently, developing the image by applying a field across the suspension which causes particle migration in image configuration. The photosensitive particles of this system exhibit fatigue characteristics in that they remain electrically sensitive for a period of time after having been exposed to activating electromagnetic radiation.

BACKGROUND OF THE INVENTION

This invention relates in general to imaging systems and, more specifically, to improved electrophoretic imaging systems. This application is a divisional application of our copending application Ser. No. 675,864 filed Oct. 17, 1967.

An electrophoretic imaging system has recently been developed capable of producing colored images which utilizes electrically photosensitive particles. This process is described in detail and claimed in copending applications Ser. Nos. 384,737 now Pat. No. 3,384,565; 384,681 and 384,680 both now abandoned all filed July 23, 1964. In such an imaging system, variously colored light absorbing particles are suspended in a non-conductive liquid carrier. The suspension is placed between electrodes subjected to a potential difference and exposed to an image. When these steps are completed, selective particle migration takes place in image configuration providing a visible image at one or both of the electrodes. In a monochromatic system, particles of a single color may be used producing a single colored image analogous to conventional black and white photography. In a polychromatic system, natural color images can be produced by using mixtures of particles of two or more different colors which are each sensitive only to light of a specific wavelength or narrow range of wavelengths.

In order to obtain images of optimum quality, the potential applied across the imaging suspension between the electrodes is conventionally on the order of several thousand volts. This high potential is maintained between a pair of electrodes one of which is conductive called the injecting electrode and the other of which has an insulating surface backed by a conductive core called the blocking electrode. Ordinarily, one of these electrodes is transparent and the image to be reproduced is projected onto the imaging suspension through said transparent electrode. The electrodes are brought into contact with the suspension while the potential is imposed between them during exposure.

The prior art process as described above produces high quality color images. However, several disadvantages are apparent in the prior art process. For example, in the prior art process, it was necessary to have field applied during the imaging exposure. It was, therefore, conventional to use a transparent conductive electrode which was at least as large as the desired image. Conductive transparent materials are expensive and usually fragile. In addition, it was not possible to sequentially image and then to develop the resulting image.

SUMMARY OF THE INVENTION

It is, therefore, an object of this invention to provide an electrophoretic imaging system and apparatus therefore which overcomes the above-noted disadvantages.

It is another object of this invention to provide an electrophoretic sequential imaging system and apparatus therefore capable of producing relatively high quality images.

It is another object of this invention to provide an electrophoretic imaging system and apparatus which does not require the use of relatively large conductive transparent electrodes.

It is another object of this invention to provide an electrophoretic imaging system and apparatus wherein field application is not required during the imaging step.

It is another object of this invention to provide a relatively simple non-complex electrophoretic imaging system and apparatus.

The foregoing objects and others are accomplished in accordance with this invention by providing an electrophoretic imaging system wherein an imaging suspension of electrically photosenstive particles in a liquid carrier is exposed to activating electromagnetic radiation and an electrical field causing imagewise particle migration. The electrically photosensitive particles of this invention, will after having been exposed to light, respond to subsequent application of electric field. In operation, the suspension is exposed to a pattern of activating electromagnetic radiation. The suspension is subsequently subjected to an electric field which causes imagewise particle migration.

In the prior art, imagewise exposure of the imaging suspension was carried on simultaneously with application of field. The electric field was applied simultaneously through conductive electrodes or was present as an electrostatic charge on the surface of insulating members brought in contact with the imaging suspension. Heretofore, it was possible to develop images, that is, for particle migration to take place, only if the imagewise activating exposure and the field were present simultaneously. It has been learned that imaging suspension may be prepared wherein simultaneous field and light exposure is not required. It is possible to expose such an imaging suspension to activating electromagnetic radiation and then subsequently develop the image by exposure to a uniform electric field. The amount of time which can elapse between exposure to activating radiation and the developing step depends largely on the imaging suspension used, the amount of exposure used, and the developing field strength.

The characteristic of particles in an imaging suspension which allows development subsequent to imagewise exposure is referred to as fatigue. Whether a particular imaging suspension exhibits fatigue characteristics cannot be predicted. However, one skilled in the art may easily determine this characteristic by using an apparatus similar to that shown in FIG. 1. The apparatus is described in detail later. In general, the experiment is performed as follows: An imaging suspension is coated on the conductive surface of a NESA glass plate and exposed to imagewise activating electromagnetic radiation. Imagewise exposure is then discontinued. The charged developing electrode is then rolled across the suspension providing an image on the conductive surface of, for example, a NESA glass plate. The time interval between discontinuance of the light exposure and the termination of image formation on the surface of the NESA glass is defined as the fatigue characteristic for the particular imaging suspension. The fatigue characteristic for a particular suspension may be determined under various operating conditions by varying the amount of exposure that the imaging suspension is exposed to an also by varying the strength of the field across the imaging suspension during the developing step. The amount of time which can elapse between discontinuance of the exposure and image formation on the surface of the NESA plate may vary from a few hundredths of a second to hours.

For those particles having a fatigue characteristic of less than about one second, the embodiment of FIG. 1 should be modified to eliminate the delay entailed in moving the roller blocking electrode to the injecting electrode. Instead, so that field may be applied shortly after imagewise exposure has been terminated, the blocking electrode should be in the shape of a flat plate and should be placed on the imaging suspension before imagewise exposure.

The exact mechanism of fatigue is not fully understood. In general, however, fatigue is that property of a material which allows the material to remain conductive or at least responsive to field for a relatively long period of time after it has been exposed to activating electromagnetic radiation. Materials which do not exhibit fatigue return to an insulating or non-responsive state immediately after termination of activating exposure.

Conventionally, the image formed on the surface of the injecting electrode, here, the conductive transparent electrode, is transferred to a receiving sheet and fixed thereon for further use and viewing. However, since a negative image is formed on one of the electrodes and a positive image is formed on the other, it is possible to use either image. The image may be fixed in place by spraying a binder on it, laminating an overlay on it, or by including a binder in solution in the liquid suspending medium. The image is preferably transferred from the electrode and fixed on another surface so that the electrode may be reused. Such a transfer step may be carried out by adhesive pickoff with an adhesive tape such as Scotch Brand Cellophane Tape or preferably, by electrostatic field transfer. Electrostatic transfer may, for example be carried out by carrying out the imaging procedure described and then passing a second roller over the particle image formed on the injecting electrode holding the second roller at a potential opposite in polarity to that of the first electrode. If the transfer roller is covered with a paper sleeve, this paper will pick up the complete image as the electrode rolls over the injecting electrode. In addition, the particles may include a component that may be made tacky by the application of heat or a properly selected solvent so that either of these can be used to adhere and fix the particle image to the electrode or to a transfer surface.

The surface of the blocking electrode and the transfer electrode may be of any suitable insulating material. Typical materials are Baryta paper, cellulose acetate, polyethylene coated paper, cellophane, nitro cellulose, polystyrene, polytetrafluoroethylene, polyvinylfluoride, polyethylene terephthalate, and mixtures thereof.

In the embodiment of this invention wherein imagewise exposure is projected through one of the electrodes, any suitable transparent conductive electrode material may be used. Typical conductive transparent electrode materials include: conductively coated glass such as tin or indium oxide coated glass, aluminum coated glass, or similar coatings on plastic substrates. NESA is preferred because of its high transparency and inertness to the imaging suspension.

Both electrodes, however, may be made of any conductive electrode material and may be opaque. Typical conductive electrode materials include: metal surfaces such as aluminum, brass, stainless steel, copper, nickel, zinc, etc., conductively coated glass, such as tin or indium oxide coated glass, aluminum coated glass, similar coatings on plastic substrates, rubber rendered conductive by inclusion of a suitable material therein, or paper rendered conductive by inclusion of a suitable chemical therein, or through conditioning in a humid atmosphere to insure the presence therein of sufficient water content to render the material conductive.

The charging, or developing, step described above may be performed by any conventional means, for example, by corona discharge as described in U.S. Pat. 2,588,699 to Carlson or U.S. Pat. 2,777,577 to Walkup. It is preferred to use a charged blocking electrode as described previously because the particles which migrate are removed from the system immediately providing a higher quality image on both electrodes. It is also possible to use uniform light exposure to, in effect, activate the imaging suspension and then use imagewise field to provide a visible image. The imagewise field could, for example, be formed by a shaped electrode or an insulator having on its surface an electrostatic latent image.

Any suitable highly colored electrically photosensitive particle or mixtures of such particles may be used in carrying out the invention, regardless of whether the particular particle selected is organic, inorganic and is made up of one or more components in solid solution or dispersed one in the other or whether the particles are made up of multiple layers of different materials or are combinations of photosensitive and non-photosensitive materials. Highly colored electrically photosensitive particles include organics such as 8,13-dioxodinaphtho-(2,1-b;2',3'-d)-furan-6-carbox-p-methoxyanilide; Locarno Red, C.I. No. 15865, 1 - (4' - methyl-5'-chloroazobenzene-2'-sulfonic acid)-2-hydroxy-3-naphthoic acid; Watchung Red B, the barium salt of 1 - (4' - methyl - 5'-chloroazobenzene-2'-sulfonic acid) - 2 - hydroxy - 3 - naphthoic acid, C.I. No. 15865, Naphthol Red B, 1-(2'-methoxy-5'-nitrophenylazo)-2-hydroxy-3''-nitro-3-naphthanilide, C.I. No. 12355; Duol Carmine, the calcium lake of 1-(4'-methylazobenzene-2'-sulfonic acid) - 2 - hydroxy-3-naphthoic acid, C.I. No. 15850; Calcium Lithol Red, the calcium lake of 1-(2'-azonaphthalene - 1' - sulfonic acid)-2-naphthol, C.I. No. 15630; Pyranthrones; Indofast Brilliant Scarlet Toner, 3,4,9,10 - bis(N,N' - (p - methoxy-phenyl)-imido)-perylene, C.I. No. 71140; dichloro thioindigo; Pyrazolone Red B Toner, C.I. No. 21120; Methyl Violet, a phosphotungstomolybdic acid lake of a Triphenylmethane dye, C.I. 42535; Indofast Violet lake, dichloro-9,18-isoviolanthrone, C.I. No. 60010; Diane Blue, 3,3'-methoxy-4,4'-diphenyl-bis(1'' - azo - 2'' - hydroxy-3''-naphthanilide), C.I. No. 21180; Indanthrene Brilliant Orange R.K., 4,10-dibromo-6,12-anthanthrone, C.I. No. 59300; Algol Yellow G.C., 1,2,5,6 - di(C,C' - diphenyl)-thiazole-anthraquinone, C.I. No. 67300; Flavanthrone; Indofast Orange Toner, C.I. No. 71105; 1 - cyano - 2,3-phthaloyl-7,8-benzopyrrocoline and many other thio indigos, acetoacetic arylides, anthraquinones, perinones, perylenes, dioxazines, quinacridones, azos, diazos, thoazines, azines and the like; inorganics such as cadmium sulfide, cadmium sulfoselenide, zinc oxide, zinc sulfide, sulphur selenium, mercuric sulfide, lead oxide, lead sulfide, cadmium selenide titanium dioxide, indium trioxide and the like. In addition to the aforementioned pigments, other typical organic materials include polyvinyl carbazole;
2,4-bis(4,4'-diethyl-aminophenyl)-1,3,4-oxidiazole;
N-isopropylcarbazole;
polyvinyl-anthracene;
triphenylpyrrol;
4,5-diphenylimidazolidinone;
4,5-diphenylimidazolidinethione;
4,5-bis-(4'-aminophenyl)-imidazolidinone;
1,2,5,6-tetraaza cyclooctatetraene-(2,4,6,8);
3,4-di-(4'-methoxyphenyl)-7,8-diphenyl-1,2,5,6-tetraaza cyclooctatetraene-(2,4,6,8);
3,4-di(4'-phenyoxyphenyl)-7,8-diphenyl-1,2,5,6-tetraaza cyclooctateraene-(2,4,6,8);
3,4,7,8-tetramethoxy-1,2,5,6-tetraaza-cyclooctatetraene-(2,4,6,8);
2-mercapto-benzthiazole;
2-phenyl-4-alpha-nuphthylidene-oxazolone;
2-phenyl-4-diphenylidene-oxazolone;
2-phenyl-4-p-methoxybenzylidene-oxazolone;
6-hydroxy-2-phenyl-(p-dimethyl-amino phenyl)-benzofurane;
6-hydroxy-2,3-di-(p-methoxyphenyl)-benzofurance;
2,3,5,6-tetra-(p-methoxy-phenyl)-furo-(3,2f)-benzofurane;
4-dimethyl-amino-benzylidene-benzhydrazide;
4-dimethyl-aminobenzylideneiso-nicotinic acid hydrazide;
turfurylidene-(2)-4'-dimethylamino-benzhydrazide;
5-benzilidene-amino-acenaphthene-3-benzylidene-amino-carbazole;
(4,N,N-dimethylamino-benzylidene)-p-N,N-dimethylaminoaniline;
(2-nitro-benzylidene)-p-bromo-aniline;
N,N-dimethyl-N'-(2-nitro-4-cyano-benzylidene)-p-phenylene-diamine;
2,4-diphenyl-quinazoline;
2-(4'-amino-phenyl)-4-phenyl-quinazoline;
2-phenyl-4-(4'-dimethyl-amino-phenyl)-7-methoxy-quinazoline;
1,3-diphenyl-tetrahydroimidazole;
1,3-di-(4'-chlorophenyl)-tetrahydroimidazole;
1,3-diphenyl-2-4'-dimethyl aminophenyl)-tetrahydroimidazole;
1,3-di-(p-tolyl-2-[quinolyl-(2'-(]-tetrahydromidazole;
2-(4'-di-methylamino-phenyl)-5-(4''-methoxy-phenyl)-6-phenyl-1,2,4-triazine;
3-pyridil-(4')-5-(4''-dimethylaminophenyl)-6-phenyl-1,2,4-triazine;
3-(4'-amino-phenyl)-5,6-di-phenyl-1,2,4-triazine;
2,5-[bis-4'-amino-phenyl-(1')]-1,3,3-triazole;
2,5-bis[4'-(N-ethyl-N-acetyl-amino)-phenyl-(1')]-1,3,4-triazole;
1,5-diphenyl-3-methyl-pyrazoline;
1,3,4,5-tetraphenyl-pyrazoline;
1-phenyl-3-(p-methoxy-styrl)-5-(p-methoxy-phenyl)-pyrazoline;
1-methyl-2-(3',4'-dihydroxy-methylene-phenyl)-benzimidazole;
2-(4'-dimethylamino-phenyl)-benzoxazole;
2-(4'-methoxyphenyl)-benzthiazole;
2,5-bis[p-amino-phenyl-(1)]-1,3,4-oxidiazole;
4,5-diphenyl-imidazolone;
3-amino-carbazole;

copolymers and mixtures thereof.

Other materials include organic donor-acceptor (Lewis acid-Lewis base) charge transfer complexes made up of donors such as phenolaldehyde resins, phenoxies, epoxies, polycarbonates, urethanes, styrene or the like complexed with electron acceptors such as 2,4,7-trinitro-9-fluoroenone; 2,4,5,7 - tetranitro-9-fluorenone; picric acid; 1,3,5-trinitro benzene; chloranil; 2,5-dichlorobenzoquinone; anthraquinone-2-carboxylic acid, Bromal, 4-nitro-phenol; maleic anhydride; metal halides of the metals and metalloids of Groups I–B and II–VIII of the Periodic Table including for example, aluminum chloride, zinc chloride, ferric chloride, magnesium chloride, calcium iodide, strontium bromide, chromic bromide, arsenic triiodide, magnesium bromide, stannous chloride, etc.; boron halides, such as boron trifluorides, ketones such as benzophenone and anisil, mineral acids such as sulfuric acid; organic carboxylic acids such as acetic acid and maleic acid, succinic acid, citroconic acid, sulphonic acid, such as 4-toluene sulphonic acid and mixtures thereof. In addition to the charge transfer complexes it is to noted that many additional ones of the above material may be further sensitized by the charge transfer complexing technique and that many of these materials may be dry-sensitized to norrow, broaden or heighten their spectral response curves.

Quinacridones are preferred because of their high fatigue characteristic and excellent color. Any quinacridone, if suitable, may be used to prepare the imaging suspension of the present invention. Quinacridones are compounds having a structure which appears to be the condensation product of a quinoline residue with an acridine residue with two carbons of the condensation product oxidized to the quinone state. Any crystalline phase may be used if suitable. The quinacridonse may be substituted or unsubstituted.

Typical quinacridones include: 2,9 - dimethyl-quinacridone; 3,10 - dichloro - 6,13 - dihydro-quinacridone; 2,9 - dimethoxy - 6,13 - dihydro-quinacridone; 2,9 - di-methyl - 6,13 - dihydro-quinacridone; 4,11 - dimethyl-6,13 - dihydro-quinacridone; 3,4,10,11 - tetrachloro-quinacridone; 2,4,9,11 - tetrachloro quinacridone; 2,4,9,11-tetrabromo quinacridone; 1,4,8,11 - tetrafluoro quinacridone; 1,2,4,8,9,11 - hexachloroquinacridone; 2,4,9, 11-tetramethoxy-quinacridone; and mixtures thereof. In addition, angular quinacridones, such as are disclosed in U.S. Pat. 2,830,990, may be used where suitable.

2,9 - dimethyl-quinacridone, available as quindo magenta RV6803 from Harmon Colors, is preferred because of its high fatigue, excellent electrical response and pure color.

Any suitable particle structure may be employed. Typical particles include those which are made up of only the pure photosensitive material or a sensitized form thereof, solid solutions or dispersions of the photosensitive material in a matrix such as thermoplastic or thermosetting resins, copolymers of photosensitive pigments and organic monomers, multilayers of particles in which the photosensitive material is included in one of the layers and where outer layers provide light filtering action in an outer layer or a fusible or solvent softenable core of resin or a core of liquid such as dye or other marking material or a core of one photosensitive material coated with an overlayer of another photosensitive material to achieve broadened spectral response. Other photosensitive structures include solutions, dispersions, or copolymers of one photosensitive material in another with or without other photosensitively inert materials. Other particle structures include those described in U.S. Pat. 2,940,847 to Kaprelian.

Although various electrode spacings may be employed, spacings of less than 1 mil and extending down even to the point where the electrodes are pressed together as in the case of the roller electrode of FIG. 1 constitute a particularly preferred form of the invention in that they produce better resolution and superior color separation results than is produced with wider spacings. This improvement is believed to take place because of the high field strength across the suspension during development.

Where a monochromatic image is to be formed, the particles will be preferably of a single color. Where polychromatic images are to be formed, particles of two or more colors may be used. For example, for subtractive color formation, the particles will ordinarily be magenta, cyan and yellow.

Any suitable insulating liquid may be used as a carrier for the photosensitive particles and the imaging suspension. Typical insulating carrier liquids include: decane, dodecane, molten paraffin, molten beeswax, or other molten thermoplastic materials, Sohio Odorless Solvent 3440 (a kerosene extraction available from Standard Oil Company of Ohio), Isopar G (a long chain saturated aliphatic hydrocarbon available from Humble Oil Company of New Jersey) and mixtures thereof. Sohio is preferred because it is a good insulator and evaporates readily.

BRIEF DESCRIPTION OF THE DRAWINGS

The advantages of this improved method of imaging will become apparent upon consideration of the detailed disclosure of the invention especially when taken in conjunction with the accompanying drawings wherein:

Referring now to FIG. 1, there is shown an exemplary embodiment of an apparatus for forming a photoelectrophoretic image in accordance with this invention. FIG. 1 shows transparent conductive electrode, generally designated 1, which in this exemplary instance is made up of a layer of optically transparent glass 2 overcoated with a thin optically transparent layer 3 of tin oxide commercially available under the name NESA glass. This electrode shall hereafter be referred to as the "injecting electrode." Coated on the surface of injecting electrode 1 is a thin layer 4 of finely divided photosensitive particles which exhibit a fatigue characteristic dispersed in an insulating liquid carrier. The term "fatigue" for the purposes of the application, refers to that property of a particle which once attracted to the injecting electrode will allow the particle to migrate away from it under the influence of an applied electric field at some time interval after it has been exposed to actinic electromagnetic radiation. Adjacent to the liquid suspension 4 is a second electrode 5 hereinafter referred to as the "blocking electrode" which is connected to one side of a potential source 6 through a switch 7. The opposite side of potential source 6 is connected to ground as is injecting electrode 1 so that when switch 7 is closed an electric field is applied across the liquid suspension 4 between electrodes 1 and 5.

Figure 1:
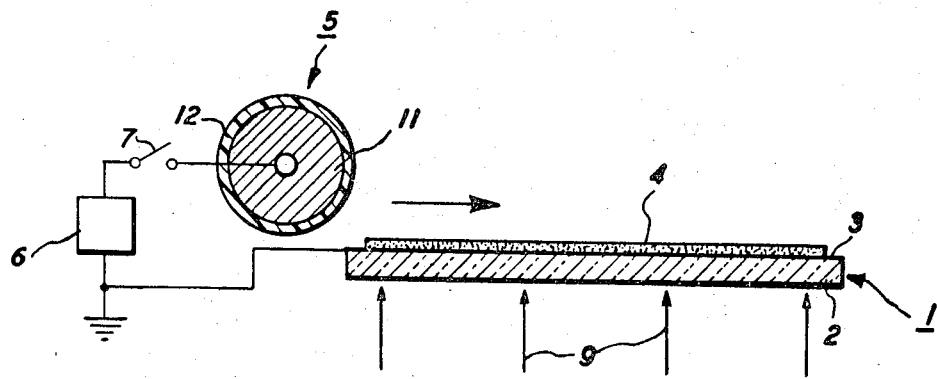
FIG. 1 is a side sectional view which schematically shows an exemplary imaging system.

The process operates as follows: imaging layer 4 is exposed to imagewise activating electromagnetic radiation 9. The activating exposure may be either full frame or partial frame. More than one exposure may be used. In the case where more than one exposure is used, the exposures may be simultaneous or sequential. The amount of time which can elapse between the initial imagewise exposure and the developing, or charging, step for sequential imaging depends on the fatigue characteristic for the particular imaging layer. The time which elapses between the initial imagewise exposure and the development of the image must not exceed the fatigue characteristic for the particular imaging suspension. The imagewise exposures may be, for example, light projected through a transparency or light information projected from opaque subjects.

After imagewise exposure or exposures are completed, switch 7 is closed and blocking electrode generally designated 5 which is shaped in the form of a roller, comprising a conductive central core 11 which is covered with a layer of a blocking material 12 which may be baryta paper or suitable material, is then rolled across the imaging suspension layer. The application of field between electrode 5 and electrode 1 causes particles to migrate through the carrier liquid and adhere to the surface of the blocking electrode 5 leaving behind a pigment image on the injecting electrode surface which is a duplicate of the imagewise exposure or combination of exposures that the suspension layer was exposed to. For example, in the case where more than one transparency was used as the image source, the image left behind on the surface of injecting electrode 1 represents a duplicate of the combination of these transparencies. (It is obvious that the final imagewise exposure need not be terminated before blocking electrode 5 is rolled across the surface of the injecting electrode 1.) Preferably, the particulate image formed on the surface of injecting electrode 1 is transferred to a receiving sheet and fixed thereon for further use or viewing. As described in copending application Ser. No. 542,050, filed Apr. 2, 1966, in the U.S. Patent Office, a transfer roller may be utilized to receive the image from the injecting electrode surface. Conventionally, a potential is imposed on the transfer roller, which normally is structurally identical with the blocking electrode, which is opposite in sign to that used on the blocking electrode during the developing step. Normally, during the transfer step the image areas are light exposed either to white light or to suitably filtered white light. Where desired, the surface of the particulate image on the injecting electrode may be moistened with additional carrier liquid to improve the transfer step.

Figure 2:
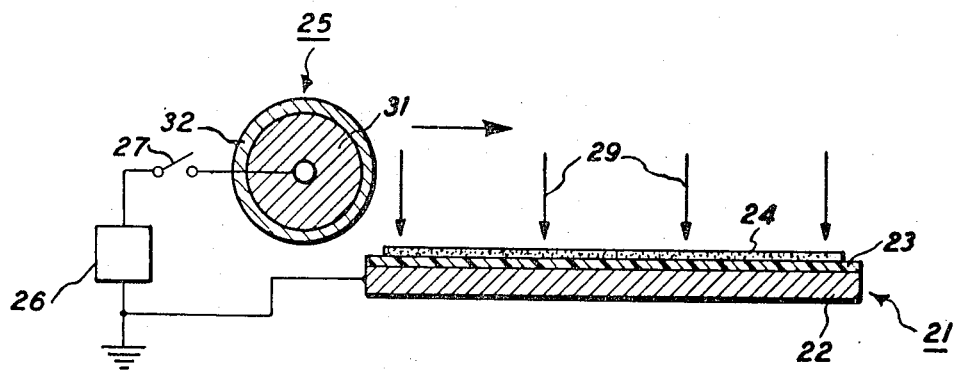
FIG. 2 is a side sectional view which shows schematically an exemplary imaging system which does not utilize a large transparent, conductive electrode.

Referring now to FIG. 2, there is shown an exemplary embodiment of a system for forming a photoelectrophoretic image on one of the electrodes which does not require the use of a transparent conductive electrode. In FIG. 2, there is shown a blocking electrode generally designated 21 which comprises a conductive plate 22 which in this exemplary instance is aluminum, which has placed on its surface a film 23 of Tedlar (a polyvinyl fluoride available from du Pont). A thin layer 24 of finely divided photosensitive particles which exhibit a memory effect dispersed in an insulating liquid carrier is then coated on sheet 23. Adjacent to the liquid suspension 24 is a second electrode generally designated 25 hereinafter called the "injecting electrode" which is connected to one side of a potential source 26 through a switch 27. The opposite side of potential 26 is connected to ground as is blocking electrode 21 so that when switch 27 is closed, an electric field is applied across the liquid suspension 24 between electrodes 25 and 21.

The process is operated as follows: imaging suspension 24 is exposed to imagewise activating electromagnetic radiation in a manner similar to that of FIG. 1 with the exception that here the exposure need not be projected through either electrode. After termination of the imagewise exposure injecting electrode 25 which comprises a conductive central core 31 covered with a sheet of conductive paper 32 is rolled across the surface of the Tedlar sheet while field is applied. Application of field causes particles to migrate in image configuration providing a visible image on both electrodes. The particulate image may be fixed in place or the paper may be removed from the conductive core and the image fixed thereon or the image may be transferred to another member and fixed thereon for further use or viewing. The image may be transferred by pressure or electrostatically.

DESCRIPTION OF THE PREFERRED EMBODIMENTS

The following examples further specifically illustrate the present invention. The examples below are intended to illustrate various preferred embodiments of the improved imaging method. The parts and percentages are by weight unless otherwise indicated.

EXAMPLE I

In all of the examples which follow, the imaging suspension is held in the dark for at least 30 minutes before imagewise illumination of the suspension. 100 grams of Naphthol Red B, C.I. No. 12355, available from American Cyanamid (code 20–7575), is dissolved in reagent grade ethylenediamine in a closed container. The solution is filtered through a covered funnel and the filtrate poured into reagent grade isopropanol. The suspension thus formed is centrifuged in capped bottles. The pigment is then washed with an isopropanol-de-ionized water mixture. The pigment is then washed with dimethylformamide followed by methanol washing. The pigment is then dried.

About 8 parts of the purified Naphthol Red B is then suspended in 92 parts of Sohio Odorless Solvent 3440, a kerosene fraction available from Standard Oil of Ohio.

The suspension prepared above is then used in an apparatus of the general type illustrated in FIG. 1 with the suspension coated on a NESA glass substrate through which exposure is made. The NESA glass surface is connected in series with a switch, a potential source, and the conductive center of a roller having baryta paper on its surface. The roller is approximately 2½ inches in diameter and is moved across the plate surface at about 2 inches per second. The plate employed is approximately 3 inches square and is exposed with a light intensity of about 960 foot-candles as measured on the uncoated NESA glass surface. The magnitude of the potential applied between the two electrodes is about 3500 volts. The negative terminal is connected to the roller. The exposure is made with a 3200° K. lamp through a transparency. Imagewise illumination is continued for 5 seconds. Exposure is then terminated. The roller is then rolled across the surface of the suspension with potential applied. An image, consisting of pigment particles, is found deposited on the surface of the NESA glass, with a complimentary image being formed on the baryta paper surface.

EXAMPLE II

About 8 parts Naphthol Red M. C.I. No. 12390, available from American Cyanamid (code 20–7515), purified as was the Naphthol Red B of Example I is suspended in 92 parts of Sohio 3440.

The suspension is tested in the apparatus of Example I using the same conditions as in Example I except that imagewise illumination is made on the free surface of the imaging suspension as shown in FIG. 2. An image, consisting of pigment particles is found deposited on the surface of the NESA glass with a complementary image being formed on the blocking electrode surface.

EXAMPLE III

About 8 parts of quindo magenta RV 6803, a 2,9-dimethyl quinacridone as obtained from Harmon Colors is suspended in about 92 parts of Sohio Odorless Solvent 3440.

The suspension is tested in the apparatus of Example I using the exposure arrangement of Example II with the following exception: imagewise exposure of about 1000 foot-candles for about one second is used. An image is formed on the surface of the NESA glass and the baryta paper.

EXAMPLE IV

The experiment of Example III is repeated except that after the first imagewise exposure has been terminated imagewise illumination is made through a second transparency, approximately 10 seconds after the first imagewise illumination. The second imagewise illumination is also of approximately 1000 foot-candle-seconds total exposure. An image conforming to a combination of the two imagewise illuminations is found formed on the surface of the NESA glass, a complementary image is formed on the baryta paper surface.

EXAMPLE V

The experiment of Example IV is repeated except that four imagewise illuminations of approximately 1000 foot-candle-seconds each are made at about 15 second intervals. An image conforming to a combination of the four imagewise illuminations is found formed on the surface of the NESA glass, a complementary image is formed on the baryta paper.

EXAMPLE VI

Approximately 4 parts of quindo magenta are suspended in approximately 100 parts Sohio. The suspension is then used in an apparatus of the general type illustrated in FIG. 2. The suspension is coated on 2 mil Tedlar, a polyvinylfluoride film available from du Pont, which is placed on the approximately 3 inch square by ¼ inch thick aluminum plate. The aluminum plate is connected in series with a switch, a potential source and the conductive center of a roller having a 2 mil thick sheet of cellophane on its surface. The roller is approximately 2 inches in diameter and is moved across the surface of the Tedlar at a rate of about 2 inches per second. The magnitude of the potential applied is about 3500 volts with the positive terminal connected to the roller. Imagewise illumination of approximately 1000 foot-candles is made as in Example I with the exception that the exposure is directed onto the suspension directly as shown in FIG. 2. After an exposure of about one second the imagewise illumination is discontinued and the roller is rolled across the suspension with potential applied. An image consisting of migrated pigment particles is found deposited on the surface of the cellophane, a complementary image is formed on the opposite electrode.

EXAMPLE VII

The experiment of Example V is repeated except that four imagewise illuminations of approximately 1000 foot-candle-seconds each are made at about 15 second intervals. An image conforming to a combination of the four imagewise illuminations is found formed on the surface of the cellophane sheet, a complementary image is formed on the opposite electrode.

Although specific components and proportions have been stated in the above description of preferred embodiments of the invention, other typical materials as listed above if suitable may be used with similar results. In addition, other materials may be added to the suspension to synergize, enhance, or otherwise modify the properties of the imaging layer. For example, a plastic component could be added to the suspension which on evaporation of the carrier liquid would coat the final images produced.

Other modifications and ramifications of the present invention will occur to those skilled in the art upon a reading of the present disclosure. These are intended to be included within the scope of this invention.

What is claimed is:

1. A photoelectrophoretic imaging apparatus comprising an opaque first electrode supporting a photoelectrophoretic liquid imaging suspension having fatigue characteristics, means to expose the free surface of said suspension to a pattern of electromagnetic radiation, means for applying an electrical field across said suspension, a second opaque electrode for contacting said suspension, and means for moving said second electrode into and out of contact with said suspension to form an image.

2. The apparatus of claim 1 wherein said opaque second electrode is a roller electrode having an insulating surface and further including means for rolling said roller over said imaging suspension during exposure.

References Cited
UNITED STATES PATENTS

| | | | |
|---|---|---|---|
| 3,384,566 | 5/1968 | Clark | 204—181 |
| 3,427,242 | 2/1969 | Mihajlov | 204—300 |

DONALD LEVY, Primary Examiner

J. C. COOPER III, Assistant Examiner

U.S. Cl. X.R.

355—3; 204—180, 181